United States Patent
Schmiederer et al.

(10) Patent No.: US 6,323,627 B1
(45) Date of Patent: Nov. 27, 2001

(54) D.C.-D.C. CONVERTER WITH A TRANSFORMER AND A REACTANCE COIL

(75) Inventors: Claus Schmiederer, Rheinau-Freistett; Robert Kern, Buehlertal, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,112

(22) PCT Filed: Feb. 24, 1999

(86) PCT No.: PCT/DE99/00494

§ 371 Date: Nov. 15, 2000

§ 102(e) Date: Nov. 15, 2000

(87) PCT Pub. No.: WO99/44278

PCT Pub. Date: Sep. 2, 1999

(30) Foreign Application Priority Data

Feb. 28, 1998 (DE) ............................................. 198 08 637

(51) Int. Cl.⁷ .............................. G05F 1/10; G05F 1/652; G05F 1/40
(52) U.S. Cl. ......................... 323/222; 323/271; 323/282
(58) Field of Search .................... 323/222, 235, 323/271, 282

(56) References Cited

U.S. PATENT DOCUMENTS

| | | | |
|---|---|---|---|
| 4,720,668 | 1/1988 | Lee | 323/271 |
| 4,841,220 * | 6/1989 | Tabisz et al. | 323/282 |
| 4,857,822 | 8/1989 | Tabisz | 323/282 |
| 4,866,367 | 9/1989 | Ridley | 323/287 |
| 4,931,716 * | 6/1990 | Jovanovich et al. | 323/285 |
| 4,977,493 * | 12/1990 | Smith | 363/126 |
| 5,343,140 | 8/1994 | Gegner | 323/222 |
| 5,418,704 * | 5/1995 | Hua et al. | 363/21 |
| 5,543,704 | 8/1996 | Thoren | 323/222 |
| 5,594,629 | 1/1997 | Steigerwald | 363/21 |

FOREIGN PATENT DOCUMENTS 0 508 595   10/1992  (EP) ............................. H02M/3/155

OTHER PUBLICATIONS

Liu K–H, Oruganti, R, Lee F C Y: "Quasi–Resonant Converters—Topologies and Characteristics" IEEE Trans. Power Electron, vol. PE–2, No. 1, Jan. 1987, pp. 62–71.

* cited by examiner

Primary Examiner—Peter S. Wong
Assistant Examiner—Bao Q. Vu
(74) Attorney, Agent, or Firm—Kenyon & Kenyon

(57) ABSTRACT

A DC-DC converter having a transformer, a reactance coil and a controllable switch for turning a DC supply voltage on and off. The contact gap of a switching transistor is set at a reference potential at a connecting tap between a primary winding and a secondary winding of the reactance coil, which is connected like a transformer with a certain transformation ratio. The anode-cathode segment of a diode and an output capacitor are set at reference potentials in series with the secondary winding of the reactance coil, with the output voltage for a load being applied across the output capacitor. The DC supply voltage is supplied to the primary winding of the reactance coil over an inductance arrangement, and a capacitance arrangement is arranged in parallel with the contact gap of the switching transistor so that a series resonant circuit, which is operative in the turn-on and turn-off phases of the switching transistor, is provided by the inductance arrangement and the capacitance arrangement.

10 Claims, 2 Drawing Sheets

D.C.-D.C. CONVERTER WITH A TRANSFORMER AND A REACTANCE COIL

BACKGROUND INFORMATION

1. Field of the Invention

The present invention relates to a DC-DC converter having a transformer and a reactance coil and a controllable switch for turning the DC voltage supply on and off definition of the in claim 1.

2. Background Information

To supply power to loads, DC-DC converters in various designs are used for many purposes, e.g., for supplying power to gas discharge lamps, in particular high pressure gas discharge lamps used in motor vehicles.

Thus, for example, flyback converters, flux converters and CuK converters may be used. In addition, quasi-resonant converters are discussed in "Quasi-Resonant Converters Topologies and Characteristics" by Kwang-Hwa Liu, Ramesh Oruganti and Fred Lee: IEEE Transactions on Power Electronics, vol. PE-2, no. 1, Jan. 1987.

SUMMARY OF THE INVENTION

An object of an exemplary embodiment of the present invention is to provide a DC-DC converter that provides a voltage transformer having a high efficiency at the lowest possible cost through circuit technology measures.

The DC-DC converter according to an exemplary embodiment of the present invention is believed to provide a considerable reduction in switching losses at what is believed to be very low cost in terms of the circuit technology. Another special advantage is the reduced EMP (electromagnetic pollution) and the associated phenomena and countermeasures.

According to an exemplary embodiment of the present invention, the in the DC-DC converter, which is designed as a constant-current transformer, is that the contact gap of a switching transistor is set at the reference potential at the connecting tap between the primary and secondary windings of the reactance coil which is connected as a transformer with a certain transformation ratio; the anode-cathode segment of a diode and an output condenser are arranged at the reference potential in series with the secondary winding of the reactance coil, where the output voltage for a load is supplied over the output capacitor; the input DC voltage is sent to the primary winding of the reactance coil via the reactance coil, and a capacitor is arranged in parallel with the contact gap of the switching transistor, thus creating with the inductance and the capacitance a series resonant circuit that is effective in the turn-on and turn-off phases of the switching transistor.

According to an other exemplary embodiment of the voltage transformer according to the present invention, the switching transistor is switched to conducting when the voltage applied to its conducting segment is approximately at a value of zero. In another exemplary embodiment, a circuit is provided that detects the voltage applied to the conducting segment of the switching transistor and detects its zero crossings. Through these measures, conducting state power losses and switching losses of the switching transistor are greatly reduced.

In an expedient refinement of this exemplary embodiment of the present invention, the switching transistor is a MOS-FET transistor.

According to another exemplary embodiment of the voltage transformer according to the present invention, which contributes toward a further reduction in cost, the reactance coil upstream from the primary winding is implemented as a discrete reactance coil or, with a suitable choice of the coupling factor, as the leakage inductance of the reactance coil.

According to another exemplary embodiment of the present invention, the capacitor to be connected parallel to the contact gap of the switching transistor can be implemented by a discrete capacitor or by the parasitic output capacitance of the component or by a combination of the two possible embodiments.

In another exemplary embodiment of the present invention, the MOS-FET transistor is controlled at the gate with a gate resonance control.

According to an exemplary embodiment of the present invention, a gate resonance control or controller is also made available in particular for controlling a DC-DC converter such as that provided by the measures according to the exemplary embodiment of the present invention, in which the gate resonance control includes a gate reactance coil upstream from the gate of a MOS-FET transistor which switches the DC supply voltage, where the gate reactance coil can be connected to a control voltage source over the cathode-anode segment of a first diode and a first transistor switch, but it can also be connected to reference potential over the anode-cathode segment of a second diode and a second transistor switch, where the parasitic gate-drain capacitance and the parasitic gate-source capacitance are used as capacitances for the resonant circuit, and the clock cycle of turning the two transistor switches on and off is selected so that the gate voltage escalates in the desired manner. In another embodiment of this gate resonance control, bipolar transistors are used as the transistor switches.

DESCRIPTION OF THE EMBODIMENTS

Figure 1:
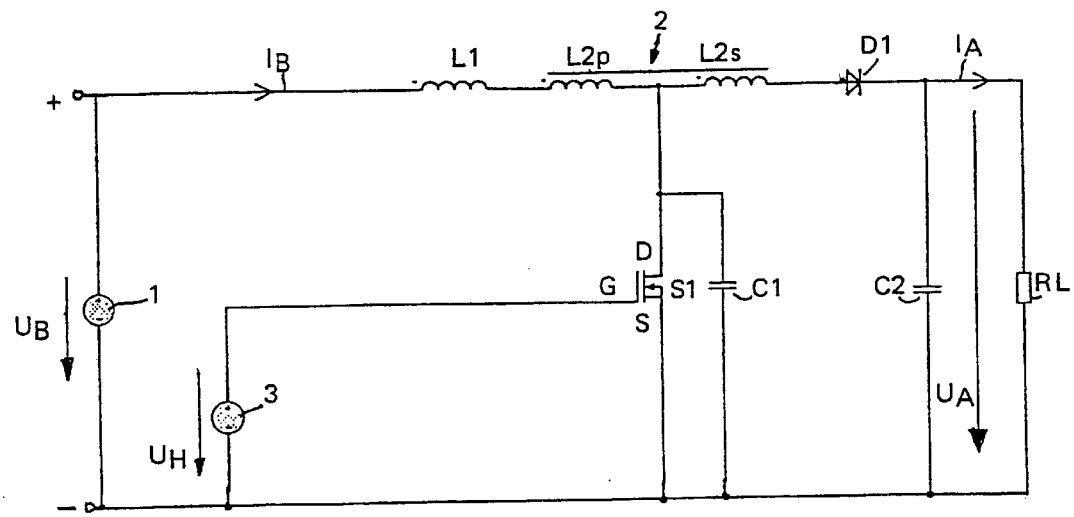
FIG. 1 shows a block diagram of a circuit arrangement of the DC-DC converter according to an exemplary embodiment of the present invention.

FIG. 1 shows schematically in a block diagram the circuit of the DC-DC converter according to an exemplary embodiment of the present invention, which is referred to below simply as a voltage transformer. A source 1 with voltage $U_B$ is connected in series with a reactance coil L1 and primary winding L2P of a reactance coil 2 connected as a transformer having a transformation ratio ü to the contact gap of a transistor S1, which may be a MOS-FET transistor. At the tie point of the contact gap of transistor S1 with primary winding L2P, an output capacitor C2 is connected over a secondary winding L2S of reactance coil 2 and the anode-cathode segment of a diode D1. Output voltage $U_A$ is available at this output capacitor C2 and in conjunction with a current $I_A$. It is also applied to a load resistor $R_L$ which is connected in parallel to capacitor C2. A capacitor C1 is arranged in parallel with the contact gap of switching transistor S1. Switching transistor S1 is controlled and switched at its gate by an auxiliary voltage source 3 with voltage $U_H$.

The voltage transformer designed as a reactance converter is thus composed of switching transistor S1, reactance coil 2 which is connected as a transformer having transformation ratio ü, diode D1 and output capacitor C2.

In the phase in which switching transistor S1 is conducting, magnetic energy is stored in primary reactance coil inductor L2P, the energy thus stored is delivered to the load circuit, i.e., capacitor C2 and load resistor RL, in the non-conducting phase of switching transistor S1. The current in the load circuit commutates across diode D1. Transformation ratio ü of reactance coil 2 is determined by the ratio of L2P+L2S to L2P.

Figure 2:
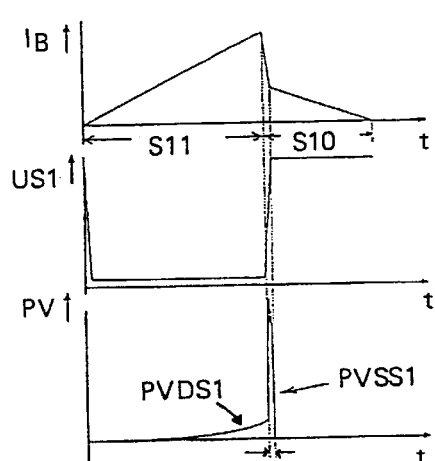
FIG. 2 shows a diagram with the variation over time of various signals with a "traditional" voltage transformer.

FIG. 2 shows a diagram of the variation over time of various signals for a traditional voltage transformer. In the diagram at the top, input current $I_B$ is plotted over time t with a phase S11 during which switching transistor S1 is conducting, i.e., is switched on, and with a phase S10 during which switching transistor S1 in FIG. 1 is non-conducting. Current $I_B$ increases from zero up to a maximum value at the switching point, then drops steeply during switching and loss time $t_V$ and then drops more gradually to zero. The middle diagram shows voltage $U_{S1}$, plotted over time with a low conducting-state voltage in phase S11 when switching transistor S1 in FIG. 1 is conducting and with a high voltage in phase S10 when switching transistor S1 is non-conducting, i.e., it is turned off. The respective voltage transition at the switching time is very steep, almost rectangular.

The lower diagram shows power loss $P_V$ plotted over time t. Before the switching point, there is a slight increase in conducting state power loss PVDS1 according to the rising current value and the uniformly low conducting-state voltage; then after the switching point, loss PVSS1 occurring during switching time $t_V$ increases steeply according to the steep increase in voltage US1. This is represented by the clearly discernible peak in FIG. 2.

As thus shown by the diagram in FIG. 2, power loss $P_V$ in switching transistor S1 assumes very large values in the transition from the conducting state to the non-conducting state. The efficiency that can be achieved with this traditional voltage transformer is determined essentially by these turn-off losses.

According to an exemplary embodiment the present invention, reactance coil L1 and capacitor C1 are introduced as illustrated in the circuit according to FIG. 1. Thus, the traditional structure of the voltage transformer is expanded by the addition of a series resonant circuit which is effective in the turn-off and non-conducting phases of switching transistor S1. In this way, a quasi-resonant converter structure is made available.

Figure 3:
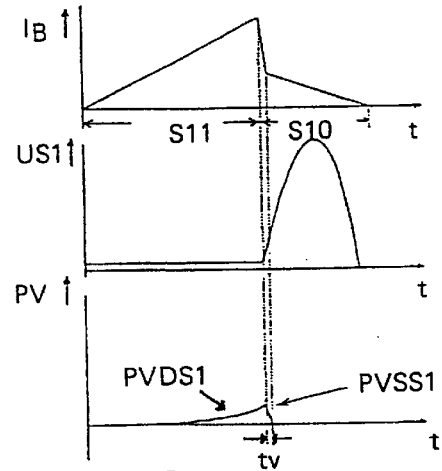
FIG. 3 shows a diagram with the variation over time of various signals in the circuit arrangement according to an exemplary embodiment of the present invention, for comparison with the corresponding signals in FIG. 2.

FIG. 3 shows various signals in the circuit according to an exemplary embodiment of the present invention in time diagrams in comparison with the corresponding signals in FIG. 2. Curves for input current $I_B$, voltage $U_{S1}$, at switching transistor S1 and power loss $P_V$ on the quasi-resonant reactance coil converter are shown.

In the upper diagram, input current $I_B$, is plotted over time t with a phase S11 during which switching transistor S1 in FIG. 1 is conducting, i.e., it is turned on, and with a phase S10 during which switching transistor S1 in FIG. 1 is non-conducting. Current $I_B$ increases from zero up to a maximum value at the switching point, drops steeply during switching and loss time $t_V$ and then drops more gradually to zero.

The middle diagram shows voltage $U_{S1}$, plotted over time t with a low conducting-state voltage in phase S11, when switching transistor S1 in FIG. 1 is conducting and with a sinusoidal voltage rising and falling to zero in phase S10, when switching transistor S1 is non-conducting, i.e., it is turned off. The respective voltage transition at the switching time is very flat due to the sinusoidal form in comparison with the almost square-wave shape in FIG. 2. The lower diagram shows power loss $P_V$ plotted over time t. According to the increasing current value and the uniformly low conducting-state voltage, there is a slight increase in conducting state power loss PVDS1 before the switching point; then after the switching point, loss PVSS1 occurring during switching time $t_V$ advantageously drops rapidly to zero in accordance with the rapid drop in the value of current $I_B$, than the value of voltage US1 which does not increase as steeply. This is illustrated with the descending branch which is shown clearly in FIG. 3.

The switching operations taking place with the circuit according to FIG. 1, which can also be implemented on the basis of the signal curves shown in FIG. 3, are explained below. It should be assumed that switching transistor S1 is conducting. It then carries current $I_B$, which can also be referred to as the magnetization current. It is determined by inductances L1 and L2p as well as input voltage $U_B$. When switching transistor S1 is turned off, the current is commutated into capacitor C1 arranged in parallel with the contact gap of switching transistor S1. The current through switching transistor S1 drops to zero very rapidly. Capacitor C1 and reactance coil (L1+L2p) together form a series resonant circuit which is connected to the positive pole of input voltage $U_B$ and to the ground potential. The voltage across switching transistor S1 thus increases in a sinusoidal pattern. The turn-off power loss $P_V$ resulting from the transistor current and the voltage across the switching transistor is consequently many times lower than that with a traditional DC-DC converter, as shown by a comparison of the diagrams in FIGS. 2 and 3. The energy stored in capacitor C1 at switch-off time fluctuates in the form of a damped oscillation between the resonant elements. Energy is fed back into voltage source 1, e.g., a battery. As soon as the voltage on the anode of diode D1 is greater than output voltage $U_A$, diode D1 becomes conducting. Energy stored in reactance coil L2p in the conducting phase S11 of switching transistor S1 is fed into the load circuit. The remaining energy still present in the series resonant circuit is also commutated into the load over diode D1. To minimize turn-on losses at switching transistor S1, switching transistor S1 is switched on according to another exemplary embodiment of the present invention when the voltage across it is zero. To do so, a circuit unit is provided to detect the zero crossings and the voltage across switching transistor S1. This circuit unit is not shown in the figures.

With regard to the elements of the series resonant circuit, the following can be said. Resonant inductance L1 can be provided as a discrete coil in the circuit. Through a suitable selection of the coupling factor of reactance coil 2, however, inductance L1 can also be implemented through the leakage inductance of reactance coil 2 and fed into the voltage transformer. This eliminates the need for a separate component.

When using a MOS-FET transistor as switching transistor S1, resonant capacitance C1 can be implemented through the parasitic output capacitance of this component. However, since this output capacitance has a great deal of leakage, depending on the voltage across the transistor, it may then be expedient to provide a discrete capacitor in parallel with the output capacitance. The tolerance range of the capacitance is narrower due to the use of the discrete capacitor.

The conducted disturbance which is emitted through the air and always occurs in "hard" switching is minimized through the "soft" turn-on and turn-off of switching transistor S1 achieved according to an exemplary embodiment the present invention. Therefore, the components and measures needed to eliminate or minimize this electromagnetic pollution (EMP) are necessary to a much smaller extent, which contributes to a considerable improvement with regard to quality and cost.

According to an exemplary embodiment of the present invention, the transistor is controlled at the gate with a gate resonance control when a MOS-FET transistor is used as switching transistor S1.

Figure 4:
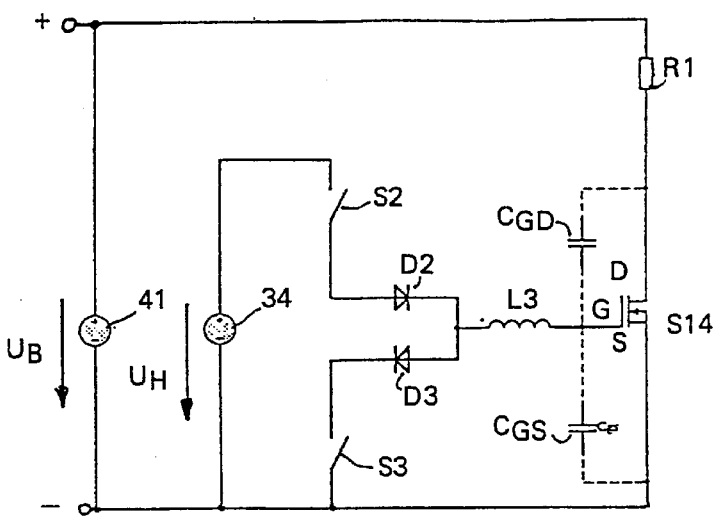
FIG. 4 shows a block diagram of a gate resonance control arrangement according to an exemplary embodiment of the present invention.

FIG. 4 shows schematically a block diagram of a gate resonance control designed according to an exemplary embodiment of the present invention. This gate resonance control or controller contains a gate reactance coil L3 upstream from gate G of a MOS-FET transistor S14 which switches DC supply voltage $U_E$ of a voltage source 41. Gate reactance coil L3 is connected to the positive pole of a control voltage source 34 over the cathode-anode segment of a first diode D2 and a first transistor switch S2 and is also connected to the reference potential over the anode-cathode segment of a second diode D3 and a second transistor switch S3. Parasitic gate-drain capacitance $C_{GD}$ and parasitic gate-source capacitance $C_{GS}$ are used as capacitances for the resonant circuit, as shown with dotted lines in FIG. 4. The clock pulse of turning the two transistor switches S2 and S3 on and off is selected so that the gate voltage escalates in the desired manner. Drain D of switching transistor S14 is connected to the positive pole of voltage source 41 across a resistor R1, and source S of switching transistor S14 is connected directly to the reference potential or the negative pole of voltage source 41.

FIG. 4 shows a time diagram of various signals which occur in the switching operations of the gate resonance control according to FIG. 4. Thus, the two upper diagrams a) and b) show the turn-on phases, labeled as 1, and the turn-off phases, labeled as 0, of the two transistor switches S2 and S3 plotted over time t, these phases being offset by 90° el. In the third diagram c), gate voltage $U_G$, which is plotted over time t is escalated out of auxiliary voltage $U_H$. In the fourth chart, lower diagram d), gate current $I_G$. is plotted over time t.

In the following explanation of the operation and functioning of the gate resonance control, the Miller capacitance, parasitic capacitance $C_{GD}$ between the gate and the drain, is omitted for the sake of simplicity.

Figure 5:
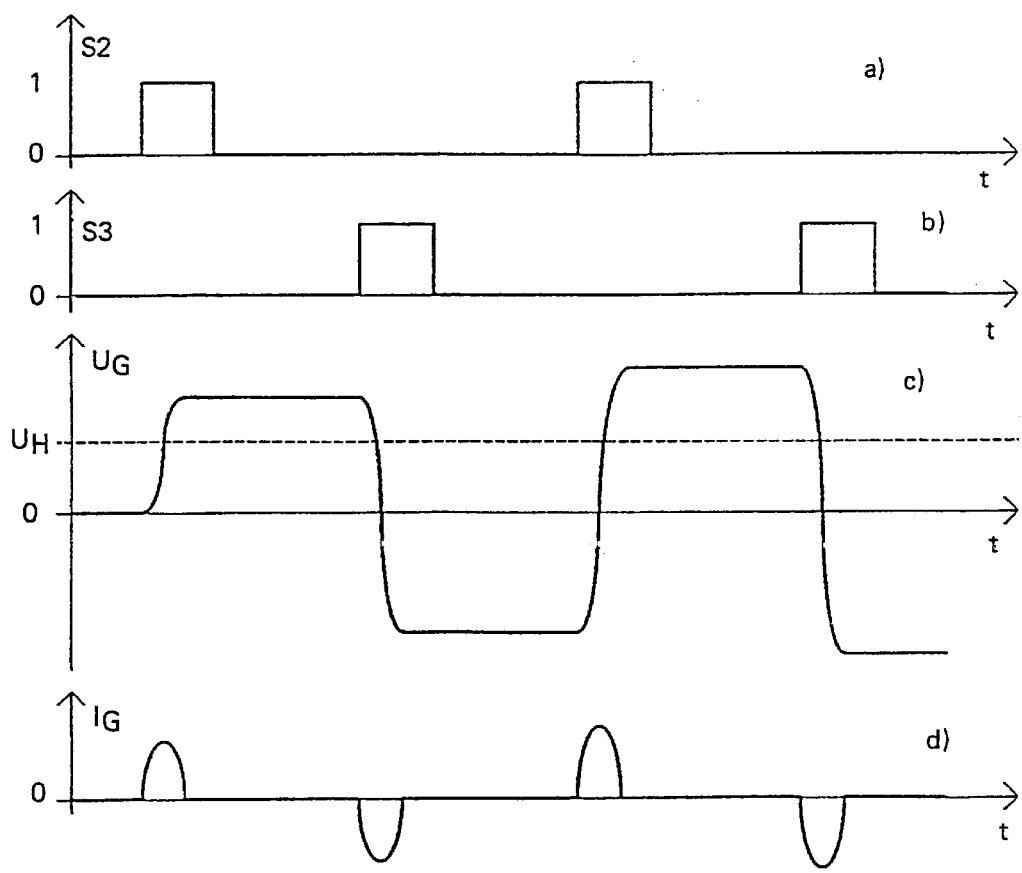
FIG. 5 shows a time diagram of different signals occurring with the switching operations of the gate resonance control arrangement.

If switching transistor S1 is to be turned on, first transistor switch S2 is closed briefly, i.e., it is switched from 0 to 1 according to FIG. 5a). Auxiliary voltage or driver voltage $U_H$ passes through diode D2 to gate reactance coil L3, which then forms a resonant circuit together with capacitance $C_{GS}$. If the voltage on gate G was zero volt at this instant, a half sine wave is then formed, with gate voltage $U_G$ increasing to twice the auxiliary voltage $U_H$ in the ideal case. At the moment when the maximum voltage is reached and the gate voltage would actually swing back, diode D2 becomes non-conducting and thus prevents gate voltage $U_G$ from dropping. Thus, the gate voltage $U_G$ which has been built up is maintained. Then transistor switch S2 can also be opened, i.e., switched from 1 to 0 according to FIG. 5a). In the exemplary embodiment using bipolar transistors as transistor switch S2 and S3, this has the advantage that the charge carriers can be eliminated now and will not interfere with shutdown later.

If switching transistor S1 is to be turned off, the second transistor switch S3 is closed briefly, i.e., it is switched from 0 to 1 according to FIG. 5b). Thus, the negative pole or ground is connected to the cathode of diode D3. The resonant circuit develops again, now oscillating from the previous gate voltage $U_G$ into a negative voltage, as illustrated in FIG. 5c). On reaching the minimum voltage, the charge is prevented from dropping back again by diode D3, which then becomes non-conducting. The negative voltage that has been built up is maintained. Like transistor switch S2 above, transistor switch S3 can now be opened again, which brings the same advantages as those described above.

If switching transistor S1 is to be turned on again, transistor switch S2 is closed briefly. Auxiliary voltage $U_H$ goes over diode D2 to gate reactance coil L3. L3 together with $C_{GS}$ again forms a resonant circuit. Since the voltage at gate G already has a negative bias at this time, gate voltage $U_G$ swings to a higher level than before. A progressively higher gate voltage $U_G$ develops over several periods, limited only by parasitic losses.

Due to the intended escalation of gate voltage $U_G$ described here, it is possible in an advantageous manner to use a FET transistor as switching transistor S1, whose threshold voltage is near or even above the auxiliary voltage or driver voltage $U_H$. One application may involve the use of a FET transistor with a threshold voltage of 7V with an auxiliary voltage or driver voltage $U_H$ of 5V. Another advantage is the more rapid switching operation, because gate current $I_G$ at the time when the threshold voltage is applied to gate G is the deciding factor for the switching speed and thus also the switching losses. Assuming that transistor switches S2, S3 can carry a certain maximum current, this yields:

with the conventional control, a current curve which assumes its maximum value immediately at the start of the switching phase of transistor switch S2 and then approaches zero exponentially; the threshold voltage is reached at a time when gate current $I_G$ amounts to only a fraction of the maximum value, typically about 50%;

with the gate resonance control according to an exemplary embodiment of to the present invention, a current curve which describes a sinusoidal rise; with this circuit, gate voltage $U_G$ reaches its threshold value precisely at the point where gate voltage $U_G$ is at its highest (curve in FIG. 5d).

Another advantage of the gate resonance control according to an exemplary embodiment of the present invention is obtained through the current source characteristic of gate reactance coil L3. This can now be explained on the basis of a shutdown case: when switching transistor S1 is turned off, the entire load current is disconnected from the source in a very short period of time. The parasitic inductances present in the source path, e.g., from the bond wire and the layout, induce a correspondingly high induction voltage due to this high current jump. If the control circuit had voltage characteristics, as is the case with conventional controls, the induced voltage would be added to the external gate-source voltage on the semiconductor chip and thus would activate the FET transistor. This would then ultimately result in a slow-down of the shutdown flank and thus to a greater power loss. However, since a current-loaded inductance is in the gate line according to an exemplary embodiment of the present invention, this effect is not manifested. This inductance in turn counteracts the change in current and in doing so induces a corresponding voltage which compensates for the voltage induced in the source line.

The influence of Miller capacitance $C_{GD}$ will now be explained. This capacitance prevents the oscillation process because it has a negative feedback effect. At the moment when gate voltage $U_G$ reaches the threshold voltage of switching transistor S1 in the oscillation process, its drain voltage drops from the previous value to zero, because ultimately it is turned on. This negative voltage flank is linked to gate G over Miller capacitance $C_{GD}$ and at that moment it counteracts the charge buildup of gate G. If the product of the drain cut-off voltage applied previously and the Miller capacitance $C_{GD}$ exceeds a certain limit value, then the opposite effect becomes so great that the escalation of gate voltage $U_G$ to progressively higher values no longer functions.

It should be pointed out here that with the MOS-FET transistors available today, the above-mentioned product is close to the limit value. Therefore, from the point of view of dimensioning with robust parameters, the actually allowed cut-off voltage of the MOS-FET transistor cannot be fully utilized with this type of circuit. The embodiment according to an exemplary embodiment of the present invention described below creates a remedy of this situation.

Figure 6:
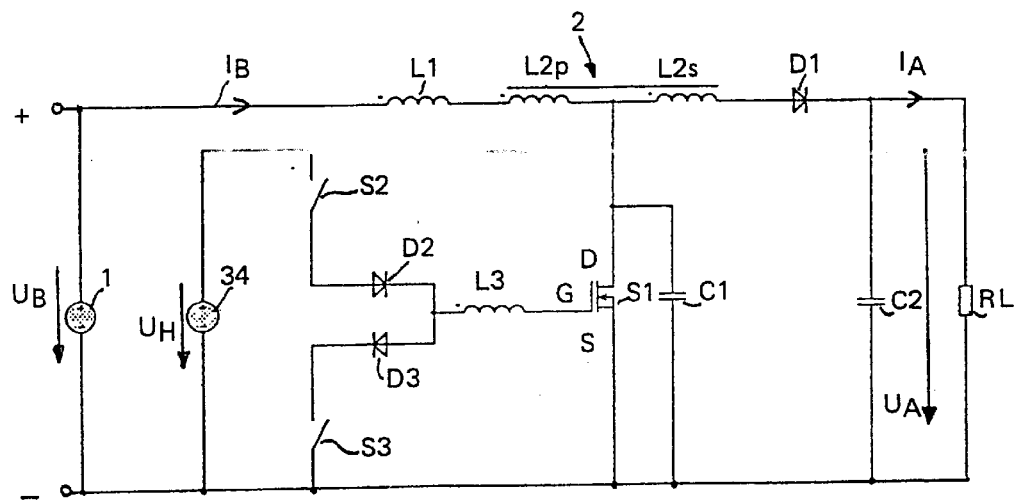
FIG. 6 shows a block diagram for the circuit arrangement of the DC-DC converter together with the gate resonance control arrangement according to an exemplary embodiment of the present invention.

FIG. 6 shows schematically in a block diagram the circuit of the quasi-resonant DC-DC converter designed according to an exemplary embodiment of the present invention, preferably switching at zero voltage, together with the gate resonance control designed according to an exemplary embodiment of the present invention. The quasi-resonant converter corresponds exactly to the circuit illustrated in FIG. 1 except that auxiliary voltage source 3 connected to gate G of switching transistor S1 is connected through the gate resonance control or controller in FIG. 4 to gate G of the switching transistor which is labeled there as S14. The circuit composed according to an exemplary embodiment of the present invention in this embodiment thus combines the quasi-resonant converter designed according to according to an exemplary embodiment of the present invention as shown in FIG. 1 with the gate resonance control according to an exemplary embodiment of the present invention as shown in FIG. 4. The quasi-resonant converter has the special advantage that the drain voltage does not increase immediately when the MOS-FET transistor used as switching transistor S1 is turned off, in particular not during the switching operation, but instead it is slowed down by the resonant elements. Thus, since only a very low drain-source voltage occurs at the FET transistor during the switching operation, the Miller capacitance $C_{GD}$ no longer causes interference. Because of the advantageous mutual support and supplementation, the gate resonance control functions especially effectively. Only after the actual switching operation of the FET transistor does the drain-source voltage increase. Although Miller capacitance $C_{GD}$ then takes effect, it has a negative influence only on the value of gate voltage $U_G$ but not on the switching operation itself.

This exemplary embodiment of the present invention reduces the control losses due to the functioning of the specially designed gate resonance control and minimizes switching losses due to the quasi-resonant converter. The power loss of the DC-DC converter is thus determined essentially only by the flux losses in the conducting phase of switching transistor S1. Thus, the voltage transformer achieves a very high efficiency. Due to the lower heat loss, a smaller heat sink is required accordingly at the same ambient temperature specifications, bringing a cost advantage due to less stringent requirements of the controller design.

This exemplary embodiment of the present invention also makes it possible for the supply voltage to the driver stage, i.e., auxiliary voltage $U_H$, to be smaller than the gate threshold voltage of switching transistor S1. Due to the gate resonance control designed according to an exemplary embodiment of to the present invention, a voltage rise is achieved at the gate, so that even non-logic-level FET transistors of 5V or more can be controlled.

This exemplary embodiment of the present invention also includes a greatly improved performance with respect to electromagnetic pollution. Since switching transistor S1 can be turned on and off with virtually no loss, a much smaller amount of energy is given off as interference over the lines and through the air in comparison with a conventional converter. This reduces the need for measures such as electromagnetic filters and shields which are otherwise necessary to comply with both statutory limits and customer demands, thus reducing costs accordingly while also increasing quality.

As explained elsewhere, it is possible with suitable dimensioning to use the leakage inductance of transformer 2 as the inductive resonance element of the series resonant circuit with capacitance C1 instead of a discrete inductance L1. When using a MOS-PET transistor as switching transistor S1, essentially the parasitic output capacitance of the transistor is suitable as a capacitive resonant element. To narrow the capacitance tolerance band, should that be necessary, a discrete capacitor such as that shown as C1 may be connected in parallel to this output capacitance of the transistor.

The exemplary embodiment of the present invention thus make available in an advantageous manner a much more effective DC-DC converter, an advantageous gate resonance control and a very low-loss combination of the two elements.

What is claimed is:

1. A DC-DC voltage converter comprising:
    an inductance arrangement;
    a reactance coil, wherein:
        the reactance coil includes a primary winding, a secondary winding and a connecting tap between the primary winding and the secondary winding;
        the reactance coil is connected as a transformer to have a transformation ratio; and
        a DC supply voltage is supplied to the primary winding of the reactance coil over the inductance arrangement;
    a controllable switching transistor arrangement for turning on and off the DC supply voltage, wherein a contact gap of the controllable switching transistor arrangement is set at a reference potential at the connecting tap;
    an output capacitor, wherein an output voltage for a load is applicable across the output capacitor;
    a diode having an anode-cathode segment, wherein the anode-cathode segment of the diode and the output capacitor is set at the reference potential and is in series with the secondary winding of the reactance coil; and a capacitance arrangement arranged in parallel with the contact gap of the controllable switching transistor arrangement so that a series resonant circuit, which is operative in a turn-on phase and a turn-off phase of the controllable switching transistor arrangement, is provided by the inductance arrangement and the capacitance arrangement.

2. The DC-DC converter of claim 1, wherein the controllable switching transistor arrangement is switched to a conducting state when a voltage applied to a conducting segment of the controllable switching transistor arrangement is approximately zero.

3. The DC-DC converter of claim 2, further comprising, a circuit arrangement for detecting a voltage applied to the conducting segment of the controllable switching transistor arrangement and for detecting zero crossings.

4. The DC-DC converter of claim 1, wherein the controllable switching transistor arrangement includes a MOS-FET transistor.

5. The DC-DC converter of claim 1, wherein the inductance arrangement, connected upstream from the primary winding, includes at least one of a discrete inductance arrangement and a leakage inductance of the reactance coil, the reactance coil having a coupling factor.

6. The DC-DC converter of claim 1, wherein the capacitance arrangement, parallel to the contact gap of the controllable switching transistor arrangement, is provided by at least one of a discrete capacitance arrangement and a parasitic output capacitance of the controllable switching transistor arrangement.

7. The DC-DC converter of claim 4, further comprising a gate resonance control arrangement, wherein a gate of the gate resonance control arrangement is used to control the MOS-FET transistor.

8. A gate resonance control arrangement for a DC-DC voltage converter, which comprises:

a gate reactance coil coupled upstream from a gate of the MOS-FET transistor, the MOS-FET transistor switching the DC supply voltage;

a first diode having a cathode-anode segment;

a first transistor switch;

a second diode having a anode-cathode segment;

a second transistor switch;

the gate reactance coil being connectable to a control voltage source across the cathode-anode segment of the first diode and the first transistor switch, and also being connectable to a reference potential across the anode-cathode segment of the second diode and the second transistor switch;

wherein:
the capacitance arrangement for the series resonant circuit includes at least one of a parasitic gate drain capacitance and a parasitic gate source capacitance; and a clock pulse for switching on and off the first transistor switch and the second transistor switch is selected so that a gate voltage is escalated as desired.

9. The gate resonance control arrangement of claim 8, wherein the first transistor switch and the second transistor switch each include a bipolar transistor.

10. The DC-DC converter of claim 8, wherein the gate resonance control arrangement controls the MOS-FET transistor to switch the DC supply voltage.

* * * * *